US010456855B2

(12) United States Patent
Sanders et al.

(10) Patent No.: US 10,456,855 B2
(45) Date of Patent: Oct. 29, 2019

(54) CONSUMABLE CARTRIDGE FOR A PLASMA ARC CUTTING SYSTEM

(71) Applicant: Hypertherm, Inc., Hanover, NH (US)

(72) Inventors: Nicholas A. Sanders, Enfield, NH (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 419 days.

(21) Appl. No.: 14/708,972

(22) Filed: May 11, 2015

(65) Prior Publication Data

US 2015/0319836 A1    Nov. 5, 2015

Related U.S. Application Data

(63) Continuation-in-part of application No. 14/079,163, filed on Nov. 13, 2013, which is a
(Continued)

(51) Int. Cl.
*B23K 10/00* (2006.01)
*B23K 37/00* (2006.01)
*H05H 1/34* (2006.01)

(52) U.S. Cl.
CPC ............ *B23K 10/006* (2013.01); *B23K 10/00* (2013.01); *B23K 37/003* (2013.01); *H05H 1/34* (2013.01);
(Continued)

(58) Field of Classification Search
CPC .... B23K 10/006; B23K 10/00; B23K 37/003; H05H 1/34; H05H 2001/3457; H05H 2001/3468; H05H 2001/3489
(Continued)

(56) References Cited

U.S. PATENT DOCUMENTS 2,985,050 A   5/1961   Schwacha
3,018,360 A   1/1962   Engel
(Continued)

FOREIGN PATENT DOCUMENTS

DE    2010/00921      8/2010
DE    202013010576 U1  2/2014
(Continued)

OTHER PUBLICATIONS

Amada America Inc.,"Amada WACS System", Retrieved from the internet at: http://www.amada.de/en/laser/wacs-system.html, printed Oct. 27, 2016, 2 pages.
(Continued)

*Primary Examiner* — Dana Ross
*Assistant Examiner* — Joseph M Baillargeon
(74) *Attorney, Agent, or Firm* — Proskauer Rose LLP

(57) ABSTRACT

The invention features a frame for a plasma arc torch cartridge. The frame includes a thermally conductive frame body having a longitudinal axis, a first end configured to connect to a first consumable component, and a second end configured to mate with a second consumable component. The frame body surrounds at least a portion of the second consumable component. The frame also includes a set of flow passages formed within the frame body. The set of flow passages fluidly connects an internal surface of the frame body and an external surface of the frame body. The set of flow holes is configured to impart a fluid flow pattern about the second consumable component.

11 Claims, 11 Drawing Sheets

Related U.S. Application Data continuation-in-part of application No. PCT/US2014/056546, filed on Sep. 19, 2014.

(60) Provisional application No. 61/991,114, filed on May 9, 2014, provisional application No. 62/036,393, filed on Aug. 12, 2014.

(52) U.S. Cl.
CPC ............ *H05H 2001/3457* (2013.01); *H05H 2001/3468* (2013.01); *H05H 2001/3489* (2013.01)

(58) Field of Classification Search
USPC .............. 219/121.44, 121.5, 121.59, 121.52, 219/121.49, 76.16, 119, 121.36, 121.48, 219/121.53, 137.62; 313/231.31, 231.51; 315/111.21; 75/10.19
See application file for complete search history.

(56) References Cited

U.S. PATENT DOCUMENTS

| | | |
|---|---|---|
| 3,153,133 A | 10/1964 | Ducati |
| 3,279,177 A | 10/1966 | Ducati |
| 3,294,953 A | 12/1966 | Spies |
| 3,518,401 A | 6/1970 | Mathews |
| 3,684,911 A | 8/1972 | Perugini et al. |
| 4,011,996 A | 3/1977 | Tsuji et al. |
| 4,034,250 A | 7/1977 | Kiselev et al. |
| 4,087,050 A | 5/1978 | Tsuji et al. |
| 4,311,897 A | 1/1982 | Yerushalmy |
| 4,355,262 A | 10/1982 | Chan et al. |
| 4,519,835 A | 5/1985 | Gauvin et al. |
| 4,570,048 A | 2/1986 | Poole |
| 4,620,080 A | 10/1986 | Arata et al. |
| 4,682,005 A | 7/1987 | Marhic |
| 4,687,139 A | 8/1987 | Lockwood |
| 4,733,052 A | 3/1988 | Nilsson et al. |
| 4,783,004 A | 11/1988 | Lockwood |
| 4,896,016 A | 1/1990 | Broberg et al. |
| 4,914,271 A | 4/1990 | Delzenne et al. |
| 4,924,060 A | 5/1990 | Delzenne |
| 4,929,811 A | 5/1990 | Blankenship |
| 4,940,877 A | 7/1990 | Broberg |
| 4,948,485 A | 8/1990 | Wallsten et al. |
| 4,967,055 A | 10/1990 | Raney et al. |
| 4,982,067 A | 1/1991 | Marantz et al. |
| 5,018,670 A | 5/1991 | Chalmers |
| 5,023,425 A | 6/1991 | Severance, Jr. |
| 5,132,512 A | 7/1992 | Sanders et al. |
| 5,144,110 A | 9/1992 | Marantz et al. |
| 5,170,033 A | 12/1992 | Couch, Jr. et al. |
| 5,183,646 A | 2/1993 | Anderson et al. |
| 5,200,595 A | 4/1993 | Boulos et al. |
| 5,208,441 A | 5/1993 | Broberg |
| 5,239,161 A | 8/1993 | Lang |
| 5,309,683 A | 5/1994 | Hackett |
| 5,390,964 A | 2/1995 | Gray, Jr. |
| 5,409,164 A | 4/1995 | Delzenne et al. |
| 5,440,477 A | 5/1995 | Rohrberg et al. |
| 5,502,245 A | 3/1996 | Dassel et al. |
| 5,518,221 A | 5/1996 | Zurecki et al. |
| 5,556,562 A | 9/1996 | Sorenson |
| 5,558,842 A | 9/1996 | Valliliou et al. |
| 5,560,844 A | 10/1996 | Boulos et al. |
| 5,580,531 A | 12/1996 | Vassiliou et al. |
| 5,695,662 A | 12/1997 | Couch, Jr. et al. |
| 5,717,187 A | 2/1998 | Rogozinski et al. |
| 5,796,067 A | 8/1998 | Enyedy et al. |
| 5,801,282 A | 9/1998 | Dassel et al. |
| 5,841,095 A | 11/1998 | Lu et al. |
| 5,844,196 A | 12/1998 | Oakley |
| 5,860,849 A | 1/1999 | Miller |
| 5,874,707 A | 2/1999 | Iida et al. |
| 5,897,795 A | 4/1999 | Lu et al. |
| 5,968,379 A | 10/1999 | Zhao et al. |
| 5,994,663 A | 11/1999 | Lu |
| 6,084,199 A * | 7/2000 | Lindsay ................ B23K 10/00 219/121.5 |
| 6,096,993 A | 8/2000 | Marhic et al. |
| 6,133,542 A | 10/2000 | Dvorak et al. |
| 6,147,318 A | 11/2000 | Marhic |
| 6,163,008 A | 12/2000 | Roberts et al. |
| 6,169,264 B1 | 1/2001 | Marhic |
| 6,256,873 B1 | 7/2001 | Tiffany et al. |
| 6,320,156 B1 | 11/2001 | Yamaguchi et al. |
| 6,337,460 B2 | 1/2002 | Kelkar et al. |
| 6,365,867 B1 | 4/2002 | Hooper |
| 6,444,945 B1 | 9/2002 | Maschwitz et al. |
| 6,525,292 B1 | 2/2003 | Girold |
| 6,616,767 B2 | 9/2003 | Zhao et al. |
| 6,657,162 B1 | 12/2003 | Jung et al. |
| 6,703,581 B2 | 3/2004 | Jones et al. |
| 6,713,711 B2 | 3/2004 | Conway et al. |
| 6,717,096 B2 | 4/2004 | Hewett et al. |
| 6,800,336 B1 | 10/2004 | Fornsel et al. |
| 6,881,921 B2 | 4/2005 | Horner-Richardson et al. |
| 6,888,092 B2 | 5/2005 | Walters |
| 6,903,301 B2 | 6/2005 | Jones et al. |
| 6,919,526 B2 | 7/2005 | Kinerson et al. |
| 6,936,786 B2 | 8/2005 | Hewett et al. |
| 6,946,616 B2 | 9/2005 | Kinerson et al. |
| 6,989,505 B2 | 1/2006 | MacKenzie et al. |
| 7,030,337 B2 | 4/2006 | Baker et al. |
| 7,161,111 B2 | 1/2007 | Schneider |
| 7,196,283 B2 | 3/2007 | Buchberger et al. |
| 7,202,440 B2 | 4/2007 | Hewett et al. |
| 7,220,937 B2 | 5/2007 | Hofman et al. |
| 7,375,302 B2 | 5/2008 | Twarog et al. |
| 7,411,149 B2 | 8/2008 | Schneider |
| 7,423,235 B2 | 9/2008 | Severance, Jr. |
| 7,598,473 B2 | 10/2009 | Cook et al. |
| 7,615,720 B2 | 11/2009 | Sanders |
| 7,622,693 B2 | 11/2009 | Foret |
| 7,671,294 B2 | 3/2010 | Belashchenko et al. |
| 7,759,599 B2 | 7/2010 | Hawley et al. |
| 7,927,094 B2 | 4/2011 | Fong et al. |
| 8,030,592 B2 | 10/2011 | Weidman |
| 8,035,055 B2 | 10/2011 | Twarog et al. |
| 8,089,025 B2 | 1/2012 | Sanders |
| 8,097,828 B2 | 1/2012 | Roberts et al. |
| 8,115,136 B2 | 2/2012 | Mather et al. |
| 8,203,095 B2 | 6/2012 | Storm et al. |
| D669,508 S | 10/2012 | Krink et al. |
| 8,373,084 B2 | 2/2013 | Salsich |
| 8,389,887 B2 | 3/2013 | Liebold et al. |
| 8,395,076 B2 | 3/2013 | Matus |
| 8,395,077 B2 | 3/2013 | Duan et al. |
| 8,455,786 B2 | 6/2013 | Fang |
| 8,546,719 B2 | 10/2013 | Warren, Jr. et al. |
| 8,575,510 B2 | 11/2013 | Laurisch et al. |
| 8,581,139 B2 | 11/2013 | Severance, Jr. |
| 8,624,150 B2 | 1/2014 | Simek et al. |
| 8,698,036 B1 | 4/2014 | Zhang et al. |
| 8,698,306 B2 | 4/2014 | Yu et al. |
| 8,759,715 B2 | 6/2014 | Narayanan et al. |
| 8,790,447 B2 | 7/2014 | Bieri et al. |
| 8,921,731 B2 | 12/2014 | Krink et al. |
| 9,157,360 B2 | 10/2015 | Hoy-Peterson et al. |
| 9,398,679 B2 | 7/2016 | Namburu |
| 9,550,251 B2 | 1/2017 | Guilotta |
| 9,609,733 B2 | 3/2017 | Severance |
| 9,686,850 B2 | 6/2017 | Girold et al. |
| 2002/0012756 A1 | 1/2002 | Kuckertz et al. |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2003/0085205 A1 | 5/2003 | Lai et al. |
| 2003/0148709 A1 | 8/2003 | Anand et al. |
| 2004/0177807 A1 | 9/2004 | Pui et al. |
| 2004/0195217 A1 | 10/2004 | Conway et al. |
| 2005/0109736 A1 * | 5/2005 | Matus .................... B23K 10/00 219/121.5 |

(56) References Cited

U.S. PATENT DOCUMENTS

| | | | |
|---|---|---|---|
| 2006/0016789 A1 | 1/2006 | Mackenzie et al. | |
| 2006/0163216 A1 | 7/2006 | Brandt et al. | |
| 2006/0289397 A1 | 12/2006 | Mahawill | |
| 2006/0289398 A1 | 12/2006 | Cook et al. | |
| 2006/0289406 A1 | 12/2006 | Helenius et al. | |
| 2007/0044449 A1* | 3/2007 | O'Brien | F02K 3/10 60/39.826 |
| 2007/0045241 A1 | 3/2007 | Schneider et al. | |
| 2007/0082532 A1 | 4/2007 | Morris | |
| 2007/0082533 A1 | 4/2007 | Currier et al. | |
| 2007/0090168 A1 | 4/2007 | Snow et al. | |
| 2007/0154306 A1 | 7/2007 | Anderson et al. | |
| 2007/0181540 A1 | 8/2007 | Lindsay et al. | |
| 2007/0210034 A1 | 9/2007 | Mather et al. | |
| 2007/0262060 A1 | 11/2007 | Roberts et al. | |
| 2008/0083711 A1 | 4/2008 | Twarog et al. | |
| 2008/0210669 A1 | 9/2008 | Yang et al. | |
| 2008/0217305 A1* | 9/2008 | Sanders | H05H 1/28 219/121.49 |
| 2008/0237356 A1 | 10/2008 | Singleton et al. | |
| 2008/0308535 A1 | 12/2008 | Rego et al. | |
| 2009/0026180 A1 | 1/2009 | Yang et al. | |
| 2009/0027782 A1 | 1/2009 | Takahashi et al. | |
| 2009/0045174 A1 | 2/2009 | Haberler et al. | |
| 2009/0152255 A1 | 6/2009 | Ma et al. | |
| 2009/0206721 A1 | 8/2009 | Foret | |
| 2009/0230095 A1 | 9/2009 | Liebold et al. | |
| 2009/0230097 A1 | 9/2009 | Liebold et al. | |
| 2009/0277882 A1 | 11/2009 | Bornemann | |
| 2010/0078408 A1 | 4/2010 | Liebold et al. | |
| 2010/0084381 A1 | 4/2010 | Indraczek et al. | |
| 2010/0133241 A1 | 6/2010 | Wilhelm et al. | |
| 2010/0264120 A1 | 10/2010 | Reinke et al. | |
| 2011/0042358 A1 | 2/2011 | Albanese et al. | |
| 2012/0012560 A1* | 1/2012 | Roberts | H05H 1/34 219/74 |
| 2012/0012565 A1 | 1/2012 | Zhang et al. | |
| 2012/0036832 A1 | 2/2012 | Hoy-Petersen et al. | |
| 2012/0055907 A1 | 2/2012 | Allimant et al. | |
| 2012/0058649 A1 | 3/2012 | Okumura et al. | |
| 2012/0060691 A1 | 3/2012 | Bieri et al. | |
| 2012/0103946 A1 | 5/2012 | Krink et al. | |
| 2012/0152913 A1 | 6/2012 | Mather et al. | |
| 2012/0181257 A1 | 7/2012 | Mather et al. | |
| 2012/0246922 A1 | 10/2012 | Hussary et al. | |
| 2012/0248073 A1 | 10/2012 | Conway et al. | |
| 2012/0261392 A1 | 10/2012 | Barnett et al. | |
| 2013/0043222 A1 | 2/2013 | Leiteritz et al. | |
| 2013/0043224 A1 | 2/2013 | Leiteritz et al. | |
| 2013/0087535 A1 | 4/2013 | Barnett et al. | |
| 2013/0103466 A1 | 4/2013 | Fisher | |
| 2013/0126487 A1 | 5/2013 | Crowe | |
| 2013/0153545 A1 | 6/2013 | Kim et al. | |
| 2013/0248497 A1 | 9/2013 | Stoeger et al. | |
| 2014/0021172 A1 | 1/2014 | Sanders | |
| 2014/0023856 A1 | 1/2014 | Bisges et al. | |
| 2014/0069895 A1 | 3/2014 | Brine et al. | |
| 2014/0076861 A1 | 3/2014 | Cornelius et al. | |
| 2014/0113527 A1 | 4/2014 | Lindsay et al. | |
| 2014/0217070 A1 | 8/2014 | Pikus et al. | |
| 2015/0076819 A1 | 3/2015 | Mather | |
| 2015/0129562 A1 | 5/2015 | Severance, Jr. | |
| 2015/0181686 A1 | 6/2015 | Schulze et al. | |
| 2015/0273617 A1 | 10/2015 | Gullotta | |
| 2015/0319835 A1 | 11/2015 | Sanders et al. | |
| 2015/0319836 A1 | 11/2015 | Sanders et al. | |
| 2015/0332071 A1 | 11/2015 | Hoffa et al. | |
| 2016/0120015 A1 | 4/2016 | Crowe | |
| 2016/0174353 A1 | 6/2016 | Mitra et al. | |
| 2016/0221108 A1 | 8/2016 | Hoffa et al. | |
| 2016/0314938 A1 | 10/2016 | Park | |

FOREIGN PATENT DOCUMENTS

| | | |
|---|---|---|
| EP | 0242023 | 10/1987 |
| EP | 0875329 A1 | 11/1998 |
| EP | 1006760 A2 | 6/2000 |
| EP | 1 117 279 | 11/2001 |
| EP | 2 175 702 | 3/2009 |
| JP | 5744467 | 12/1982 |
| JP | 2011014459 A | 1/2011 |
| JP | 4688450 B2 | 5/2011 |
| JP | 4707108 B2 | 6/2011 |
| RU | 2066263 C1 | 9/1996 |
| RU | 95105277 A | 4/1997 |
| RU | 2354460 C2 | 10/2008 |
| WO | 93/13905 | 7/1993 |
| WO | 9621339 A1 | 7/1996 |
| WO | 199907193 A1 | 2/1999 |
| WO | 03/089183 A1 | 10/2003 |
| WO | 2008/101226 | 8/2008 |
| WO | 2013/103466 | 7/2013 |
| WO | 2015073522 A1 | 5/2015 |

OTHER PUBLICATIONS

Komatsu America Industries, LLC: "Next Generation Twister TFP6062-300A Power Supply Units", Retrieved from the internet at: http://www.komatsuplasma.com/kai/ctd/en/tfp6062/pdf/TFP6062_Brochure.pdf, printed Oct. 27, 2016, 2 pages.

Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.

Trumpf Inc.,"TruLaser: Cost-effective cutting through thick and thin", Retrieved from the internet at: http://www.us.trumpf.com/fileadmin/DAM/us.trumpf.com/Brochures/2D_Laser/TruLaser_US_10-12.pdf, printed Oct. 26, 2016, 32 pages.

Centricut catalog "2013-2014 Plasma torches and consumables", 68 pages.

Drawing of Hypertherm Part No. 120934, 2000 (redacted).

Thermal Dynamics XT™-300 Brochure, May 7, 2007, 6 pages; http://wv, 'W-.mitaustccl.lv/wn-contcnt/uploads/2013/I I/V- XT300-Torch.pdf.

Thermal Dynamics, "XT-301 Automated Plasma Cutting Torch", Thermadyne, Nov. 2005, 4 pages: retrieved from the internet at: http://victortechnologies.com/IM_Uploads/DocLib_5849_XT-301%20Torch%20for%20use%20w%20Merlin%201000%20Brochure%20(63/2524)_Nov2005.pdf.

Welding Magazine, "Plasma culling system for mild steel",Oct. 2008, p. 34 retrieved from the internet at: http://search.proquest.com/professional/printviewfile?accountid=157282.

Welding Magazine, "Plasma cutting systems and products: new and or upgraded plasma cutting systems and torches have been designed to offer increased flexibility and to boost performance and productivity", Apr. 2007, pp. 36-38 retrieved from the internet at: http://search.proquest.com/professional/printviewfile?accountid=157282.

\* cited by examiner

CONSUMABLE CARTRIDGE FOR A PLASMA ARC CUTTING SYSTEM

CROSS REFERENCE TO RELATED APPLICATIONS

This application is a nonprovisional of U.S. Ser. No. 61/991,114, filed May 9, 2014 and entitled "Cartridge Type Consumable Assembly for a Plasma Arc Cutting System." This application is also a nonprovisional of U.S. Ser. No. 62/036,393, filed Aug. 12, 2014 and entitled "Cost Effective Cartridge for a Plasma Arc Torch." This application is also a continuation-in-part of U.S. Ser. No. 14/079,163, filed Nov. 13, 2013 and entitled "Automated Cartridge Detection for a Plasma Arc Cutting System." This application is also a continuation-in-part of International Patent Application No. PCT/US14/56546, filed Sep. 19, 2014 and entitled "Thread Connection for a Torch System." The contents of these applications are hereby incorporated herein by reference in their entireties.

FIELD OF THE INVENTION

The invention relates generally to the field of plasma arc cutting systems and processes. More specifically, the invention relates to methods and apparatuses for simplifying, optimizing and decreasing the time and cost of cutting through the use of improved consumable cartridges.

BACKGROUND

Plasma arc torches are widely used in the cutting and marking of materials. A plasma torch generally includes an arc emitter (e.g., an electrode), an arc constrictor or constricting member (e.g., a nozzle) having a central exit orifice mounted within a torch body, electrical connections, passages for cooling, and passages for arc control fluids (e.g., plasma gas). The torch produces a constricted ionized jet of a gas with high temperature and high momentum. Gases used in the torch can be non-reactive (e.g., argon or nitrogen) or reactive (e.g., oxygen or air). During operation, a pilot arc is first generated between the arc emitter (cathode) and the arc constrictor (anode). Generation of the pilot arc can be by means of a high frequency, high voltage signal coupled to a DC power supply and the torch or by means of any of a variety of contact starting methods.

Traditional consumables suffer from a host of drawbacks both before and during a cutting operation. Before a cutting operation, selecting and installing the correct consumables for a particular cutting task can be burdensome and time-consuming. Operators must choose from a large inventory of different components, which must be selected and paired appropriately for efficient performance. During operation, current consumables encounter performance issues such as failing to effectively dissipate and conduct heat away from the torch tip and components, and failing to maintain proper consumable alignment and spacing. Furthermore, current consumables include substantial amounts of expensive materials, such as Copper and/or Vespel™, which leads to significant manufacturing costs and inhibits their widespread commercialization, production and adoption. What is needed is a new and improved consumable platform that decreases manufacturing costs, part counts and/or inventory requirements, increases system performance (e.g., increases heat conduction and improves alignment of parts internally), and eases installation and use of consumables by end users.

SUMMARY OF THE INVENTION

The present invention provides one or more cost effective cartridge designs that reduce manufacturing costs, facilitate cartridge commercialization and production, improve installation and ease of use by end users, and increase system performance. In some embodiments, numerous traditional consumable components (e.g., swirl ring, nozzle, shield, retaining cap, and electrode components) are redesigned. In some embodiments new components (e.g., an electrode sleeve, a lock ring, and/or an interfacing insulator) are created. In some embodiments, a conventional swirl ring is replaced with a different feature within the torch body that imparts a swirl to a gas flow within the torch body (e.g., a swirl feature having flow holes built directly into a body of the nozzle). In some embodiments, a nozzle shield is electrically isolated from the nozzle (e.g., by using anodized aluminum and/or plastic).

In some embodiments, each cartridge comprises one or more of the following consumable components: a frame or body having one or more sections; an arc emitter (e.g., an electrode); an arc constrictor or arc constricting member (e.g., a nozzle); a feature to impart a swirl to a gas within the plasma torch (e.g., a swirl feature built into the nozzle, a swirl ring, or another swirl feature); a shield (e.g., a nozzle shield that is electrically isolated by the use of aluminum, anodized aluminum and/or a plastic material); an emitting element (e.g., a hafnium emitter); and/or an end cap. In some embodiments, a cartridge includes a substantially copper portion (e.g., an inner core made of above 80%, preferably above 90%, pure or substantially pure copper, or a copper alloy) and a substantially non-copper portion (e.g., a non-copper portion external to the inner core). In some embodiments, a cartridge can be used on a handheld plasma cutting system and/or a mechanized plasma cutting system.

In some embodiments, a cartridge has a resilient element, such as a spring electrode or a spring start mechanism affixed to an electrode, integrated directly into the cartridge and designed not to be separable or disassemblable from the cartridge. The resilient element can be in physical communication with the frame and/or can be configured to pass a pilot current from the frame to the arc emitter. The resilient element can bias the arc emitter in a direction along an axis of the resilient element, e.g., by imparting a separating force. In some embodiments, the separating force has a magnitude that is less than a magnitude of a coupling force holding the cartridge together. In some embodiments, the cartridge does not include a spring or resilient element.

In some embodiments, the cartridge has enhanced cooling and insulative capabilities, reduced manufacturing and material costs, and/or improved recyclability, durability and performance. In some embodiments, the cartridge provides consumable components in one integrated piece. In some embodiments, the cartridge enables a significantly reduced assembly time (e.g., by a factor of 5-10). In some embodiments, the cartridge ensures that mating and/or complementary parts are always chosen correctly for a given cutting task by eliminating the need for the user to choose and assemble parts in the field, enabling easier recognition of appropriate consumable components for a given cutting task and reducing operator error. In some embodiments, the cartridge enhances consumable alignment and/or spacing because cartridge parts are assembled in a manufacturing setting, thereby achieving tighter tolerances than are possible in the field. In some embodiments, the cartridge improves heat dissipation and/or conduction capabilities. In some embodiments, heat is moved substantially away from the torch, but not so far as to heat or melt plastic components. In some embodiments, using a metal besides copper (e.g., in a region outside an inner core of copper components) helps move heat away from the torch. In some embodiments, the cartridge allows specific combinations of consumables to be pre-chosen for specific cutting tasks.

In some embodiments, the cartridge frame includes a strongly thermally conductive material, e.g., aluminum, copper, or another highly conductive metal. In some embodiments, the cartridge frame is formed by molding. In some embodiments, at least one of the first end of the cartridge frame or the second end of the frame includes a threaded region shaped to engage a complementary component. In some embodiments, the shield, the arc constrictor and the frame are thermally coupled. In some embodiments, an external surface of the frame is shaped to connect to a retaining cap. In some embodiments, the cartridge includes a shield insulator connected to the frame. In some embodiments, the shield insulator is press fit to the frame.

In some embodiments, a cartridge cap defines an aperture of the arc emitter and includes a fluid sealing surface disposed about a circumference of the arc emitter aperture. In some embodiments, the electrode comprises a spring. In some embodiments, the cartridge cap extends within a base region of the arc constricting member to a location near the set of swirl holes. In some embodiments, a base of the arc constricting member is formed by molding. In some embodiments, a retaining cap is connected to the cartridge body. In some embodiments, the retaining cap comprises a plastic. In some embodiments, the arc constricting member and the electrode are connected to the retaining cap via a base of the arc constricting member.

In some embodiments, a cartridge includes a shield connected to the cartridge body. In some embodiments, the shield is connected to the cartridge body via a shield insulator. In some embodiments, the shield insulator is press fit to at least one of the shield or a base of the arc constricting member. In some embodiments, the shield insulator is electrically insulative. In some embodiments, the shield insulator is thermally conductive. In some embodiments, the shield insulator includes anodized aluminum. In some embodiments, a sleeve is disposed about a portion of the electrode. In some embodiments, the sleeve includes an anodized layer formed to electrically isolate the electrode from a base of the arc constricting member. In some embodiments, the sleeve includes a set of flow surfaces configured to facilitate fluid flow within the plasma torch, e.g., to improve cooling.

In some embodiments, a cartridge (or consumable assembly) includes a seal disposed within the cap insert. In some embodiments, a cartridge includes a retaining cap directly connected to the gas flow diverter. In some embodiments, the retaining cap is formed of a plastic. In some embodiments, the arc constrictor and the emissive member are connected to the retaining cap via a swirl ring. In some embodiments, the shield insulator is press fit to at least one of the shield and the gas flow diverter. In some embodiments, the shield insulator is electrically insulative. In some embodiments, the shield insulator is thermally conductive. In some embodiments, the shield insulator includes anodized aluminum. In some embodiments, the shield has a heat capacity to current ratio of about 2-4 W/m-° K-A. In some embodiments, the cartridge or consumable assembly includes a sleeve disposed about a portion of the emissive member. In some embodiments, the sleeve includes an anodized layer formed to electrically isolate the emissive member from a base of the arc constrictor. In some embodiments, the sleeve includes a set of flow surfaces.

In some embodiments, the cartridge is replaced as a unit. In some embodiments, a length of the emitting element can be adjusted to match the life of the nozzle, such that the cartridge parts reach the end of their useful lives at approximately the same time. In some embodiments, cut quality can be similar to that achieved using current consumables. In some embodiments, a cartridge type consumable assembly including a spring electrode disposed within a nozzle body and a sealing device disposed within a lock ring. The sealing device can be configured to connect to a plasma arc torch. The spring electrode can include a thumbtack or contact element that extends within the electrode body and is connected to a spring disposed between the contact element and the electrode body. In some embodiments, the electrode sleeves can have shaped (e.g., scooped) front ends to direct gas flow within the cartridge.

In addition, the present invention can significantly reduce manufacturing costs. Since Vespel is significantly more expensive than aluminum, replacing Vespel with aluminum can reduce manufacturing costs of the cartridge. In some embodiments, copper is used only in certain locations in the electrode, nozzle, and/or orifice, which can reduce manufacturing costs. For example, copper can be concentrated primarily in an inner core or region. Since current flows primarily through the inner core and this inner core is axially aligned with the plasma bore and associated heat generated therein, this is the region from which heat needs to be dissipated most urgently—such a need dissipates at greater radii away from the central axis of the torch.

There are many benefits associated with using a cartridge in a plasma arc torch. First, such a design promotes ease of use through quick change capabilities, short setup time and ease of consumable selection for an end user. It also provides consistent cut performance because a suite of consumables are changed at once when the cartridge is changed. In contrast, variation in performance is introduced when components are changed individually at different times. For example, long term re-use of the same swirl ring can cause dimensional alteration after each blow-out, thereby altering the performance quality even if all other components are changed regularly. Furthermore, different cartridges can be designed to optimize torch operation with respect to different applications, such as marking, cutting, maintaining long life, etc.

In some embodiments, a spring need not be used with the electrode. Elimination of the spring reduces manufacturing costs by eliminating the spring and thumbtack components on the top of the spring electrode. In some embodiments the cartridge is a single unit. In some embodiments, the retaining cap is considered part of the torch (and not a consumable component). In this configuration, machining steps can be minimized, with no machining necessary after assembly (as compared to some torch assemblies that require a final machining step to achieve functional axiality of the cartridge). In some embodiments, the reduction in swirl holes can minimize drilling operations compared to prior art swirl rings (the cross sectional area of these larger holes is roughly equivalent to the cross sectional area of all previous smaller holes). Some of these components are molded or moldable, e.g., do not require machining. Thus, threading on the retaining cap and/or other components is not necessary to attach the components, as the components can be already press fit together.

In one aspect, the invention features a frame for a plasma arc torch cartridge. The frame includes a thermally conductive frame body having a longitudinal axis, a first end configured to connect to a first consumable component, and a second end configured to mate with a second consumable component. The frame body surrounds at least a portion of the second consumable component. The frame also includes a set of flow passages formed within the frame body. The set of flow passages fluidly connects an internal surface of the frame body and an external surface of the frame body. The set of flow holes is configured to impart a fluid flow pattern about the second consumable component.

In some embodiments, the first consumable component is a nozzle and the second consumable component is an electrode. In some embodiments, the frame body is electrically insulative. In some embodiments, the frame body is metallic or anodized. In some embodiments, at least one of the first or the second end includes a threaded region shaped to engage a complementary component. In some embodiments, the set of flow holes includes a plurality of holes that are radially offset from one another. In some embodiments, the radial offset is about 0.05 inches to about 0.5 inches.

In some embodiments, the first end is configured to connect to a shield via a shield insulator. In some embodiments, the frame facilitates thermal communication between the shield and the nozzle. In some embodiments, the external surface of the frame body is configured to connect to a retaining cap. In some embodiments, the flow passages each have a diameter of about 0.14 inches. In some embodiments, the frame includes a shield insulator connected to the frame body. In some embodiments, the frame includes a cap insert connected to the second end of the cartridge frame, the cap insert substantially orienting the electrode and retaining it within the cartridge frame. In some embodiments, the frame includes a seal disposed within the cap insert.

In another aspect, a plasma arc torch cartridge has an electrode, a nozzle, and a shield. The cartridge includes an inner portion relative to a longitudinal axis of the cartridge comprising copper. The inner portion includes at least a portion of the shield, the nozzle, and the electrode. The cartridge includes an outer portion relative to the longitudinal axis. The outer portion is at least substantially free of copper. The outer portion surrounds the copper inner portion and includes at least a portion of the shield and a portion of the nozzle.

In some embodiments, the electrode is a spring electrode. In some embodiments, the cartridge includes a set of swirl holes, wherein the cartridge cap extends within a base of the nozzle toward the set of swirl holes. In some embodiments, a base of the nozzle is metallic or anodized. In some embodiments, the cartridge includes a retaining cap connected to the cartridge frame. In some embodiments, the retaining cap is formed of a plastic. In some embodiments, the nozzle and the electrode are connected to the retaining cap via a base of the nozzle.

In some embodiments, the cartridge includes a shield connected to the cartridge frame. In some embodiments, the shield is connected to the cartridge frame via a shield insulator. In some embodiments, the shield insulator is electrically insulative. In some embodiments, the shield insulator is thermally conductive. In some embodiments, the shield insulator includes anodized aluminum. In some embodiments, the shield has a heat capacity to current ratio of about 2-4 W/m-° K-A. In some embodiments, the cartridge includes a sleeve disposed about a portion of the electrode. In some embodiments, the sleeve includes an anodized layer formed to electrically isolate the electrode from a base of the nozzle. In some embodiments, the sleeve includes a set of flow surfaces. In some embodiments, the cartridge includes a cap insert connected to the second end of the cartridge frame. In some embodiments, the cap insert substantially orients the electrode and retaining the electrode within the cartridge frame.

In another aspect, the invention features a consumable assembly for a plasma arc torch. The consumable assembly includes a metallic assembly body extending along a longitudinal axis through the metallic assembly body from a first end to a second end. The metallic assembly body defines a heat sink having a plurality of swirl holes shaped to impart a flow pattern within or around the heat sink. The consumable assembly also includes a nozzle having a base and in physical communication with the first end of the heat sink. The consumable assembly also includes an electrode disposed within a portion of the heat sink and a portion of the nozzle.

In some embodiments, the nozzle and the electrode are integrally formed as a part of within a consumable cartridge. In some embodiments, the electrode is a spring electrode. In some embodiments, the consumable assembly includes a cartridge cap, the cartridge cap extending within the base of the nozzle toward the set of swirl holes. In some embodiments, the metallic assembly body is anodized. In some embodiments, the consumable assembly includes a retaining cap directly connected to the metallic assembly body.

In some embodiments, the nozzle and the electrode are connected to the retaining cap via the metallic assembly body. In some embodiments, the consumable assembly includes a shield connected to the metallic assembly body. In some embodiments, the shield is connected to the metallic assembly body via a shield insulator. In some embodiments, the shield insulator is press fit to at least one of the shield and the base of the nozzle. In some embodiments, the shield insulator is electrically insulative. In some embodiments, the shield insulator is thermally conductive. In some embodiments, the shield insulator includes anodized aluminum.

In some embodiments, the shield has a heat capacity to current ratio of about 2-4 W/m-° K-A. In some embodiments, the consumable assembly includes a sleeve disposed about a portion of the electrode. In some embodiments, the sleeve includes an anodized layer formed to electrically isolate the electrode from the base of the nozzle. In some embodiments, the sleeve includes a set of flow surfaces. In some embodiments, the consumable assembly includes a cap insert connected to the second end of the metallic assembly body, the cap insert configured to orient the electrode and retain the electrode within the metallic assembly body. In some embodiments, the consumable assembly includes a seal disposed within the cap insert.

In another aspect, the invention features a method of cooling a plasma arc torch. The method includes providing a composite consumable having a heat sink defining a plurality of holes, the composite consumable having integrated components including an electrode, a nozzle and a shield. The method also includes installing the composite consumable in the plasma arc torch. The method also includes flowing a cooling fluid through the plurality of holes, the cooling fluid forming a fluid flow pattern that cools at least one of the electrode, nozzle or shield, thereby removing at least one watt of power from the plasma arc torch during operation.

In some embodiments, the cartridge includes a set of flow passages that are flow holes or slots that form flow holes when joined with a nozzle. In some embodiments, the frame body is formed by molding or casting. In some embodiments, the flow holes have a radial offset of about 0.05 inches to about 0.5 inches, for example 0.2 inches. In some embodiments, the flow passages have a total cross sectional area of at least about one square inch. In some embodiments, the shield insulator is press fit to the frame body. In some embodiments, the cartridge cap defines an electrode aperture and includes a fluid sealing surface disposed about a circumference of the electrode aperture. In some embodiments, the retaining cap is made of at least one of thermoplastic, Vespel™ or Torlon™. In some embodiments, the shield insulator is press fit to at least one of the shield or a base of the nozzle. In some embodiments, the cartridge includes a seal disposed within the cap insert. In some embodiments, the nozzle is external to the consumable cartridge and the electrode is within the consumable cartridge. In some embodiments, the retaining cap is formed of a plastic. In some embodiments, the cartridge cap contains the swirl holes, falls well short of them, or extends just to them.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1A:
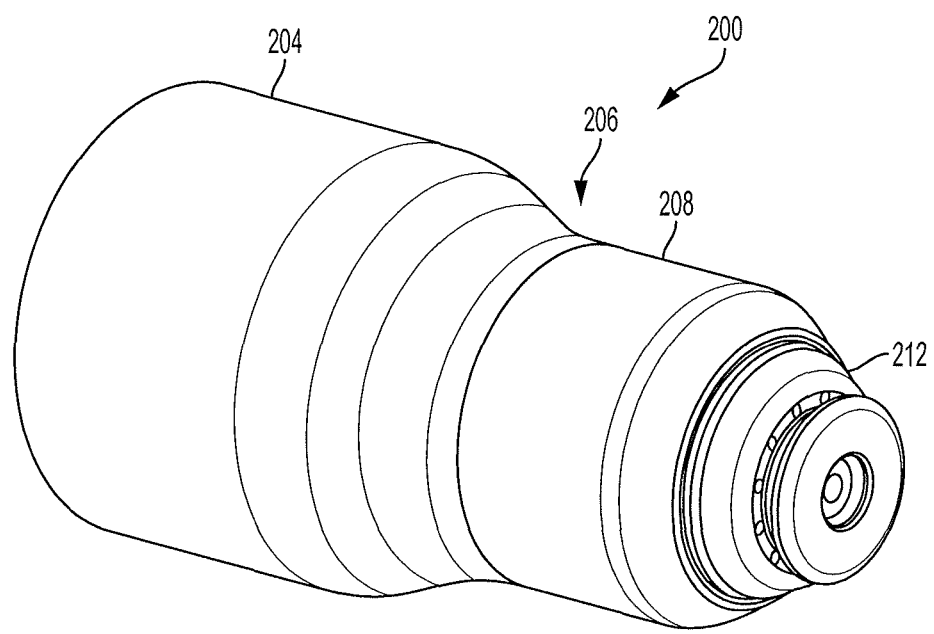
FIG. 1A is an isometric illustration of a unitary cartridge for a plasma arc cutting system, according to an illustrative embodiment of the invention.

FIG. 1A is an isometric illustration of a unitary cartridge 200 for a plasma arc cutting system, according to an illustrative embodiment of the invention. Visible from the exterior are a plastic exterior section 204, a metallic exterior section 208, and a copper exterior section 212 (e.g., a nozzle shield). The plastic exterior section 204 and the metallic exterior section 208 are joined at a junction 206. In some embodiments, the junction 206 is included in or near a tapered region. In some embodiments, the plastic exterior section 204 is a retaining cap. In some embodiments, the metallic exterior section 208 is a shield insulator. In some embodiments, the metallic exterior section 208 is formed substantially of a material other than copper (e.g., aluminum, anodized aluminum, etc.). In some embodiments, the copper exterior section 212 is formed of a pure or substantially pure copper or copper alloy. The component parts of the cartridge 200 are shown and described in more detail in the cross-sectional view shown in FIG. 1B below.

Figure 1B:
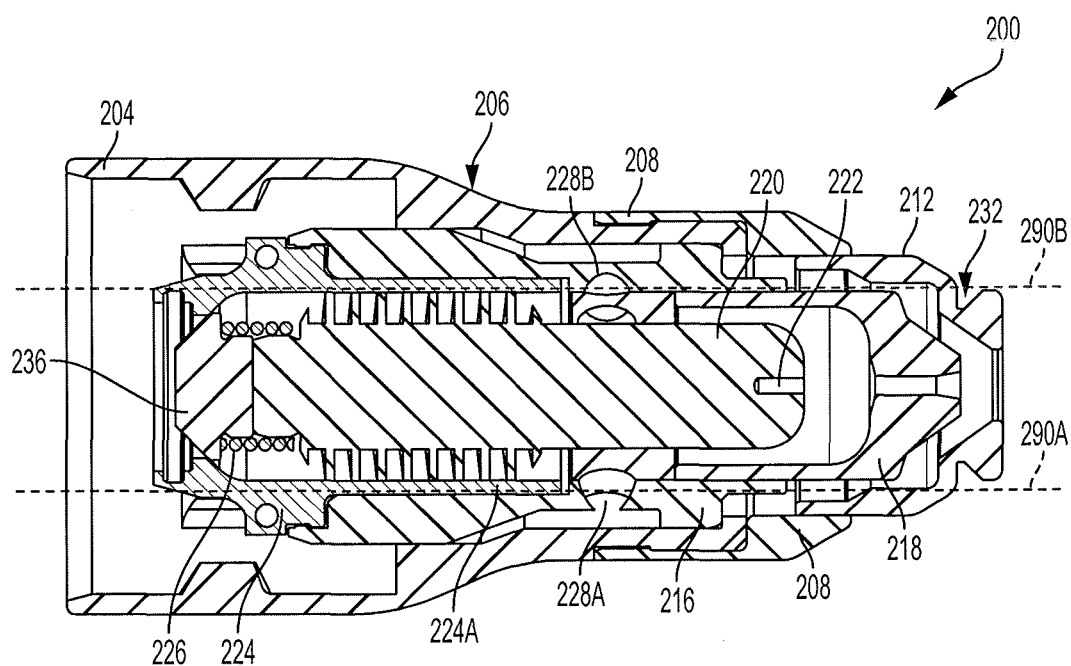
FIG. 1B is a cross-sectional illustration of a unitary cartridge for a plasma arc cutting system, according to an illustrative embodiment of the invention.

FIG. 1B is a cross-sectional illustration of a unitary cartridge 200 for a plasma arc cutting system, according to an illustrative embodiment of the invention. This view shows a nozzle body 216, a nozzle orifice 218, an electrode 220 having an emitting element 222, an insulator sleeve 224 having an elongated portion 224A, a resilient element 226, and an electrode contact button 236 (e.g., made of brass). One or more of these elements can be redesigned to achieve one or more of the above-stated objectives.

For example, the nozzle body 216 can be formed from a conductive material (e.g., a highly conductive material such as aluminum) and can be attached to (e.g., can be in direct physical contact with) other parts of the cartridge 200. In some embodiments, the nozzle body 216 is in thermal communication with certain parts of the cartridge 200 (e.g., via thermal conduction) but electrically isolated from certain parts (e.g., either the same parts or other parts with which the nozzle body 216 is in thermal communication). For example, the nozzle body 216 can function as a heat sink for the nozzle orifice 218 while remaining electrically isolated from the nozzle shield 212. Such a configuration can enhance cooling performance (for example, of the nozzle and the electrode) and reduce manufacturing costs by comparison to previously used materials (e.g., Vespel™). In some embodiments, the cartridge has a region with a thermal conductivity of between about 200-400 Watts per meter per degree Kelvin (for example, aluminum may have a thermal conductivity of between 200-250 W/m-° K, while copper may have a thermal conductivity of between 350-400 W/m-° K). In some embodiments, aluminum can be relaced with a steel alloy, e.g. SS304. In some embodiments, the consumable cartridge has a heat capacity to current ratio of 2-4 W/m-° K-A. In some embodiments, the cartridge has an inner portion (e.g., designated by dotted lines 290A, 290B in FIG. 1B, or 299A, 299B in FIG. 1C, or 390A, 390B as shown below in FIG. 2B) relative to a longitudinal axis of the cartridge comprising copper (e.g., including at least a portion of the shield, the nozzle, and the electrode). In some embodiments, the cartridge has an outer portion relative to the longitudinal axis (e.g., surrounding the copper inner portion and including at least a portion of the shield and a portion of the nozzle). The outer portion can be at least substantially free of copper. In some embodiments, the outer portion includes less than about 80% by volume copper. In some embodiments, the inner portion includes more than about 80% by volume copper. In some embodiments, the outer portion includes less than 90% by volume copper. In some embodiments, the inner portion includes more than about 90% by volume copper.

In addition, the nozzle body 216 includes a set of inlet swirl holes 228 (e.g., swirl holes 228A and 228B). In some embodiments, the set of inlet swirl holes 228 includes five swirl holes, or optionally between three and ten swirl holes. The swirl holes 228 can be radially offset to impart a swirl flow (e.g., radial and tangential velocity components) to gases flowing therethrough (e.g., a shield gas, plasma gas, and/or a plenum gas). In this configuration, the nozzle body 216 provides the swirl function previously provided by a swirl ring, thus eliminating the need for a traditional swirl ring. In addition, in some embodiments the nozzle body 216 is formed via a molding process, thus eliminating the need for expensive and time-consuming drilling procedures to create the swirl holes. In some embodiments, the nozzle shield 212 includes an angle 232 that helps redirect fluid flow away from the plasma arc during operation and helps to provide impingement cooling (e.g., gas flowing from holes 212 into angle 232).

Figure 1C:
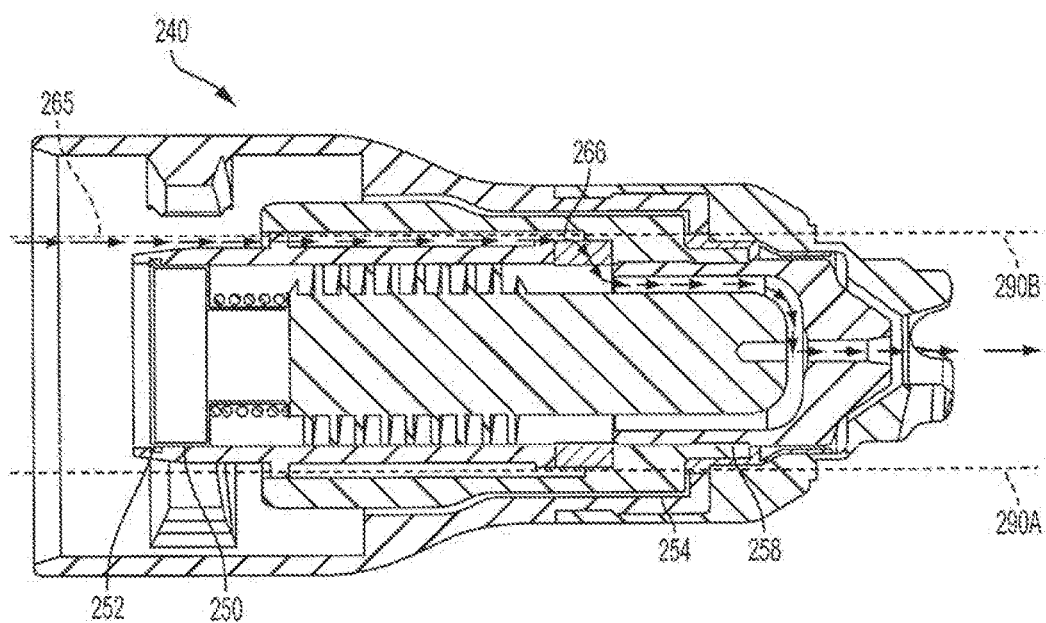
FIG. 1C is a cross-sectional illustration of a unitary cartridge for a plasma arc cutting system, according to an illustrative embodiment of the invention.

FIG. 1C is a cross-sectional illustration of a unitary cartridge 240 for a plasma arc cutting system, according to an illustrative embodiment of the invention. The unitary cartridge 240 can be similar in many respects to the cartridge 200 shown in FIG. 1B but can differ in certain other respects. For example, the cartridge 240 utilizes a stamped torch interface 250 (e.g., a stamped pieces of copper) having a cross-sectional "T"-shape. The interface 250 can allow the electrode to slide more freely than in the FIG. 1B configuration, which uses an electrode with a nipple feature that forms a mating surface with the spring. In FIG. 1C, the cap and the nozzle body have been opened to ease manufacture and allow the electrode to slide freely into the nozzle body during cartridge assembly. The spring can then rest on the electrode, and the stamped torch interface 250 can use a small tab feature 252 to snap readily into the nozzle body, securing the electrode therein. Such a configuration avoids the need to press fit multiple pieces together (and, in turn, avoids the need to have to achieve tight tolerances between pieces) and/or the need to assemble different pieces of the torch from different directions. Using the cartridge 240, a manufacturer can simply slide the electrode into place in one step.

In addition, the cartridge 240 uses a molded, slotted swirl feature 266 to achieve the swirling function instead of using holes drilled in the nozzle body. For example, during operation gas can flow along path 265 as shown, with gas flowing out of the slots 266 and into the plasma chamber to form the swirl gas about the plasma arc. During operation, gas may also flow through molded gas shield channel 254, further cooling the nozzle body. Slots 266 form a set of swirl holes once the nozzle body, nozzle orifice, and/or nozzle liner are connected. Gas delivered to the slots is conveyed from the torch through a chamber defined by an internal surface of the nozzle body and an external surface of the nozzle liner (which, in combination, form the swirl holes). Such a configuration eliminates post-process machining steps and the associated expenses. In addition, the cartridge 240 includes a radial swage connection 258 between the nozzle orifice and the nozzle body. The radial swage connection 258 provides a robust connection interface to allow contact to be maintained between the nozzle orifice and the nozzle body, but also exposes significant surface area for heat to be conducted from the nozzle orifice to the nozzle body. Finally, in this embodiment, the electrode sleeve is removed and replaced with a more traditional heat exchanger.

Figure 2A:
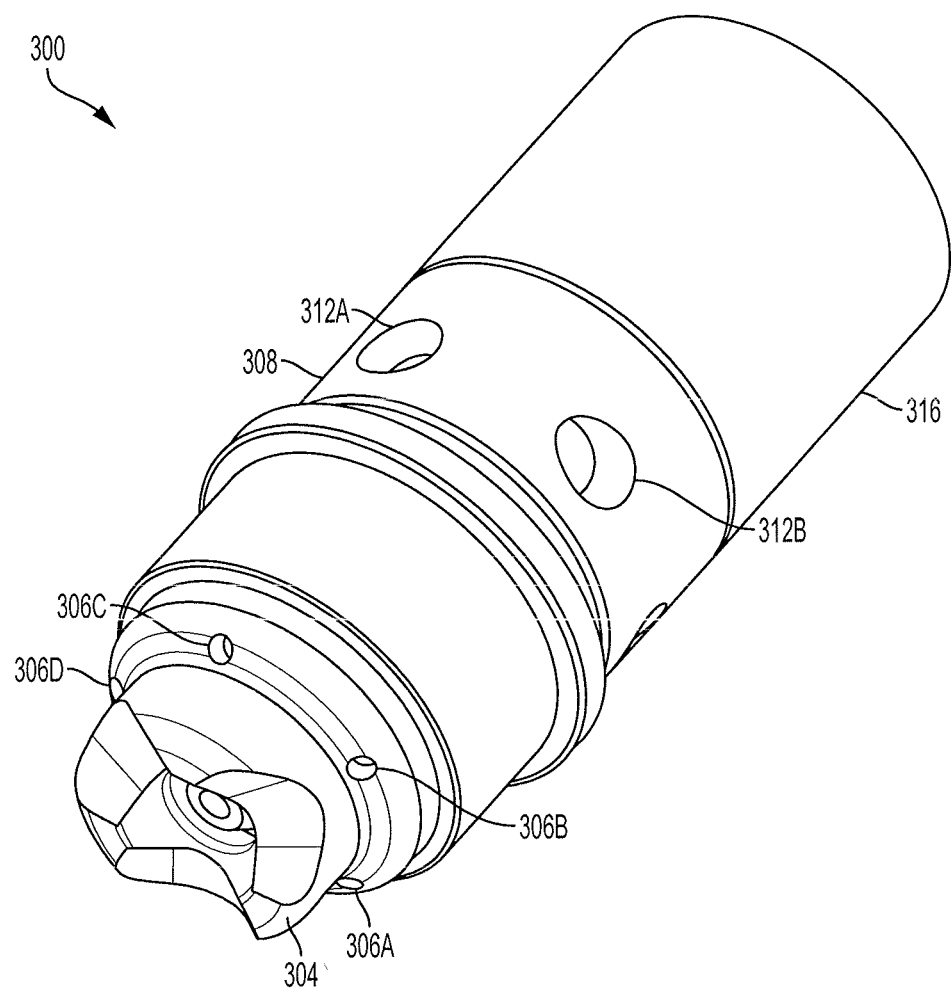
FIG. 2A is an isometric illustration of an inner cartridge assembly for a plasma arc torch, according to an illustrative embodiment of the invention.

FIG. 2A is an isometric illustration of an inner cartridge assembly 300 for a plasma arc torch, according to an illustrative embodiment of the invention. Visible from the exterior are a shield 304 having vent holes 306 (e.g., holes 306A-D as shown), a nozzle body 308 having flow holes or inlet swirl holes 312 (e.g., holes 312A, 312B as shown in FIG. 2A), a front insulator (or shield insulator) 314, and a rear insulator (or lock ring) 316. These and additional elements are described more fully in conjunction with the cross-sectional view shown in FIG. 2B below.

Figure 2B:
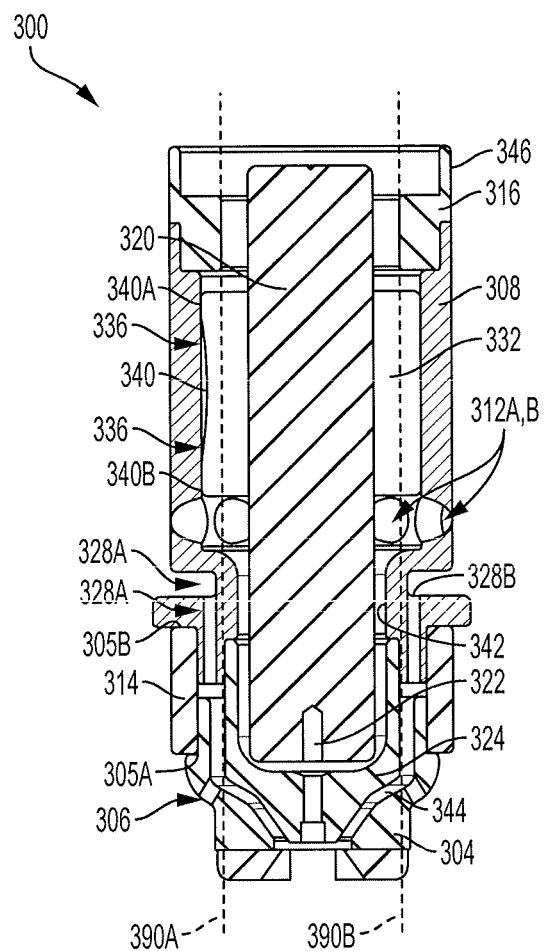
FIG. 2B is a cross-sectional illustration of the inner cartridge assembly of FIG. 2A, according to an illustrative embodiment of the invention.

FIG. 2B is a cross-sectional illustration of the inner cartridge assembly 300 of FIG. 2A, according to an illustrative embodiment of the invention. In this view, several additional components of the inner cartridge assembly 300 are visible, including an electrode 320 having an emitting element 322, an arc constrictor or nozzle orifice 324, shield flow holes 328 (e.g., flow holes 328A-B as shown) directed toward the nozzle orifice 324, an insulator sleeve 332, and a cooling gas flow channel 336. In this embodiment, the nozzle body 308 functions as the cartridge frame to which other parts attach.

A number of features of the inner cartridge assembly 300 can enhance its cooling capabilities. First, the nozzle body 308 can be made of aluminum, which can enhance heat conduction over previous materials (e.g., Vespel™) and configurations as described above. Second, the nozzle orifice 324 can be made of copper and can be pressed onto the nozzle body 308. In such embodiments, the nozzle body 308 can serve as a heat sink for the copper nozzle orifice 324. Third, improved gas flow surfaces, can assist in cooling, e.g., with shield gas flowing forward through holes 328A, 328B just outside of the press area. A press fit arrangement can also provide improved thermal conduction paths between torch parts as a result of relatively tight tolerances between the surfaces of the parts. In some embodiments, the press fit arrangement includes an interference fit and/or a tabbed or interlocking fit having one or more step-like features. In addition, the small size of the press fit design has the additional advantages of reducing manufacturing and/or material costs and simplifying manufacture and assembly of the components (e.g., by having fewer parts).

The nozzle shield 304 can also be made of copper and can be pressed onto an anodized aluminum insulator 314 at a surface 305A. This assembly can then be pressed onto the nozzle body 308 at a press fit surface 305B. In such embodiments, the shield insulator 314 connects the nozzle body 308 to the shield 304. In some embodiments, the shield insulator 314 is press fit to the nozzle body 308. In some embodiments, the shield insulator 314 is an electrically insulative ring and/or includes a set of press-fit surfaces 305A, 305B that connect the shield 304 and the nozzle body

308. The shield insulator 314 can connect the nozzle body 308 to the shield 304 such that the nozzle body 308 and the shield 304 are electrically insulated from one another while still transferring thermal energy to one another. In some embodiments, the press fit surfaces may be knurled to further enhance thermal conduction between components (e.g., between nozzle body 308 and nozzle orifice 324, between nozzle body 308 and shield 304, etc.). In some embodiments, using a two-piece shield insulator can increase (e.g., double) electrical insulation abilities as a result of increasing contact surfaces.

The nozzle shield 304 can be considerably smaller than previous shields, allowing for efficient manufacture and assembly of components, improved durability, and greater assurances of proper orientation of cartridge parts relative to one another. By way of example, for a 45-amp system, a prior art stock shield might have a diameter of about one inch and a mass of about 0.04 pounds, whereas a cartridge shield in accordance with the current invention can have a diameter of about 0.5 inches with a mass of less than 0.01 pounds (e.g., about 0.007 pounds). For a 105-amp system, a prior art stock shield might have a diameter of about one inch with a mass of about 0.05 pounds, whereas a cartridge shield in accordance with the current invention can have a diameter of about a half inch with a mass of about 0.01 pounds (e.g., 0.013 pounds).

The smaller size configuration can carry significant advantages. First, components having a reduced mass have a reduced heat capacity, which allows the components to be rapidly cooled during post-flow and/or allows more heat to be transferred to the cooling gas during operation. Second, a smaller shield can attain comparatively higher temperatures during operation and can transfer more heat to the cooling gas. In some embodiments, the nozzle shield 304 is exposed to a cold gas entering the shield area, e.g., via shield flow holes 328, which can further reduce the temperature. The flow holes 328 can each have a total cross sectional area of at least about one square inch.

In some embodiments, the electrode 320 includes a base made of copper. In some embodiments, the electrode 320 base has a small diameter with a pressed-on insulator sleeve 332 made of anodized aluminum and/or plastic used for electrical isolation. In some embodiments, a cooling gas flow channel or gap 336 exists between the insulator sleeve 332 and the nozzle body 308. In some embodiments, a cool gas flows in the gap 336. In some embodiments, a "dumbbell" configuration 340 defined by two end contacts 340A, 340B is used, which can reduce or minimize contact area between the nozzle body 308 and the insulator sleeve 332 and can reduce friction between parts.

In some embodiments, the sleeve 332 contacts the electrode 320, which can be part of a separate current path from the nozzle body 308 and/or a different portion of the current path from the nozzle body 308. In some embodiments, the electrode 320 and the nozzle orifice 324 can be electrically separated by a gap to create the arc and/or to ensure proper orientation of the parts in the torch. In such embodiments, the nozzle body 308 and the electrode 320 can be in physical contact between the sleeve 332 and the nozzle body 308. In such embodiments, insulative layers are needed in this region so that current is directed to pass through the emitting element 322.

In some embodiments, a wall of the nozzle body 342 near which the electrode 320 moves can stay comparatively cool during operation as gas flow passes both on the inside of the nozzle body 308 and directly across an exterior surface 344 of the nozzle orifice 324. The material choice (e.g., aluminum or another metal) for the nozzle body 342 design provides for a better conduction path and heat sink ability as compared with previous materials such as Vespel™ Such factors assist in cooling the electrode isolation piece and allow the electrode to function even after a deep pit is formed in the emitting element from electrode use.

In some embodiments, a lock ring 316 (or isolation ring) forms an interface 346 between the cartridge 300 and the torch. In some embodiments, the lock ring 316 can be made of anodized aluminum. The lock ring 316 can be pressed into the nozzle body to "trap" the moveable electrode 320. The lock ring 316 can contain the components within the cartridge 300 and electrically isolate the torch. In some embodiments, the lock ring 316 is replaced by heat shrinking or gluing. In some embodiments, the lock ring 316 is shaped to orient the cartridge 300 (e.g., axially), to optimize gas flow, to enable electrical connection to the cathode, and/or to provide electrical isolation.

In various embodiments described herein, the cartridges or consumable assemblies are about 3.5 inches in length and 1.1 inches in diameter. In some embodiments, the retaining cap is considered part of the torch, e.g., not a consumable component. In such configurations, machining steps can be minimized, with no machining necessary after assembly (as compared to some torch assemblies that require a final machining step to achieve functional axiality of the cartridge). In some embodiments, the reduction in swirl holes can minimize drilling operations compared to prior art swirl rings. In some embodiments, replacing Vespel™ with aluminum can significantly reduce manufacturing costs of the cartridge. In some embodiments, copper is used only in certain locations in the electrode, nozzle, and/or orifice, which can reduce manufacturing costs. For example, copper can be concentrated primarily in an inner core or region to achieve the heat and current conduction benefits described above while minimizing the regions using the more expensive copper material.

In some embodiments, the anodized layer formed on select cartridge components can be created using a hard anodizing technique. An anodized layer formed using a Sulfuric hard anodizing process can be formed using an electrolytic solution of sulfuric acid. For example, an electrolytic solution of sulfuric acid at approximately 32 degrees Fahrenheit and a current density of about 23 to 37 Amperes per square foot can be used. The process can be run for about 20 to 120 minutes, depending on the alloy used and the desired coating thickness. A coating having a thickness of about 10 to 50 microns can be produced. This hard anodized coating can provide high corrosion resistance (e.g., 336+ hours salt spray resistance), high durability (e.g. 60-70 Rockwell C-scale rating), and electrical insulation (e.g. 800 V/mil thickness). The hard anodize coating can be dyed, which does not necessarily produce the vibrant colors that a sulfuric anodize produces.

The anodizing process can provide a surface conversion of Aluminum to $Al_2O_3$. The anodizing process can provide a hard dielectric shell of about 0.003 inches thick (including both 50% build up (e.g. deposits on the part) and 50% penetration (e.g. material change to the exposed surfaces of the component). The hard dielectric shell can provide good atmospheric corrosion resistance. For extreme environments a 5% dichromate solution sealing is recommended, which can produce fair abrasion resistance. In some embodiments, a plurality of anodized disks can be pressed or heat shrunk together. Using a plurality of disks can create adjustable electrical isolation, e.g. because each disk increases electrical isolation linearly (via each coating/layer introduced by the new surfaces of each disk). By using multiple layers, electrical isolation capability can be made very strong. In some embodiments, plastics, ceramics, lava, or Vespel can be used in place of any or all of the anodized portions/components discussed herein.

Figure 3A:
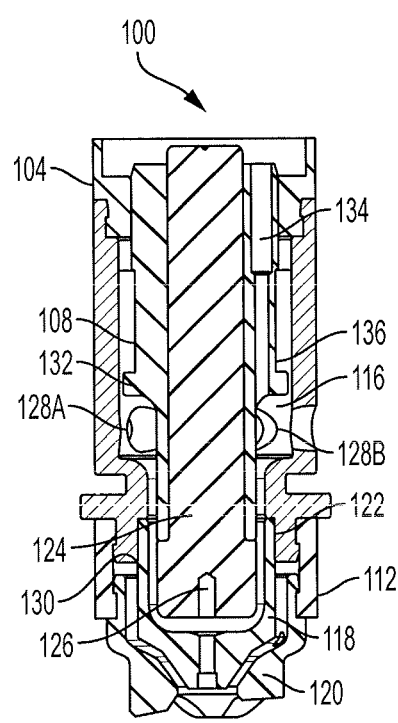
FIG. 3A is a cross-sectional illustration of an inner cartridge assembly for a plasma arc torch having plastic insulating components, according to an illustrative embodiment of the invention.

FIG. 3A is a cross-sectional illustration of an inner cartridge assembly 100 for a plasma arc torch having plastic insulating components, according to an illustrative embodiment of the invention. The inner cartridge assembly 100 includes many components similar to those in the cartridge assembly 300 shown above in FIG. 2B. However, certain portions formed from anodized aluminum above can be replaced in this configuration with plastic portions. In particular, the cartridge assembly 100 includes a rear plastic portion 104 (e.g., a high temperature thermoplastic cap to function as or replace the rear insulator or locking ring 316 shown above in FIGS. 2A-2B), a sleeve plastic component 108 (e.g., to replace the insulator sleeve 332 shown above in FIG. 2B), and a front plastic component 112 (e.g., to replace the insulator 314 shown above in FIG. 2B). In some embodiments, the plastics-based cartridge does not transfer heat as well as the anodized aluminum based cartridge and is more prone to material breakdowns. However, the plastic based approach does not rely on shells of oxide for electrical insulation, which may be susceptible to chipping, scratching, and/or cracking (leading to break down and/or failure, for example by creating a current path through the component that hinders operation or damages the system).

The plastic based cartridge 100 can include an aluminum nozzle body 116, to which other parts attach directly or indirectly—e.g., a nozzle orifice 118, a shield 120, and an electrode 124 having an emitting element 126. The nozzle orifice 118 can be pressed into the nozzle body 116, for example at press fit junction 122. As above, the nozzle body 116 can have inlet swirl holes 128 (e.g., 128A and 128B as shown) and/or holes 130 directed forward (e.g., toward the front of the cartridge) through which shield gas can pass. The shield 120 can be made of copper and/or snapped onto a high temperature thermoplastic insulator. The shield/insulator assembly can be fastened to (e.g., snapped onto) the nozzle body 116. The electrode 124 can be made of copper. The electrode 124 can include an aluminum sleeve 132 having cooling holes (e.g. upper cooling gas flow channel 134 and lower cooling gas flow channel 136) pressed onto it. The high temperature thermoplastic sleeve 108 can be connected to (e.g., snapped onto) the electrode aluminum sleeve 132. The electrode 124 can be moveable within the nozzle body 116. The high temperature thermoplastic cap 104 can be snapped into the nozzle body to "trap" the electrode. The useful life of the cartridge parts can be arranged such that the useful lives of the individual parts are similar to one another. At the end of the cartridge's life, the entire cartridge 100 can be discarded (e.g., recycled), with no parts reused.

In some embodiments, the front plastic component 112 connects to and electrically isolates the shield 120 from the nozzle body 116. In some embodiments, the nozzle body 116 includes five shield cooling holes to supply cooling gas to the shield. In some embodiments, the sleeve plastic component 108 can be stressed during operation while both the front plastic component 112 and the rear plastic component 104 face milder conditions. These conditional variations can make it desirable to use different plastics for the front, middle and/or rear plastic portions. In some embodiments, the sleeve plastic portion 108 can be exposed to large thermal extremes, while the front plastic component 112 and the rear plastic component 104 can face comparatively lower temperatures during operation. As a result, the sleeve plastic component 108 can be formed of a more robust material/plastic (which involves increased cost and difficulty to manage) while the front and/or rear components 104, 112 can be formed of a separate slightly less robust material/plastic (which involves decreased cost and difficulty to manage). In some embodiments, the torch is hottest toward the front. In some embodiments, plastics that can withstand high temperatures can be used toward the front, but these materials are often more expensive. Less expensive materials can be used in cooler areas of the torch.

Figure 12A:
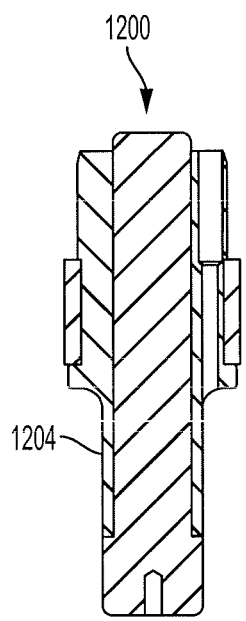
FIGS. 12A and 12B are cross-sectional views of shortened and elongated electrode sleeve assemblies, respectively, according to an illustrative embodiment of the invention.
Figure 12B:
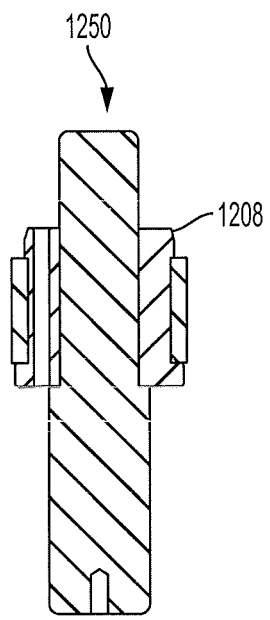

It is also possible to use anodized aluminum, ceramics, lava, or Vespel in place of any or all of these plastic portions/components. In some embodiments, cooling holes 134, 136 in the aluminum electrode sleeve 132 allow cooling gas to flow between the electrode 124 and nozzle body 116. The cooling holes 134, 136 can have different diameters within the sleeve 132 to achieve desired flow characteristics (e.g., increased flow, increased pressure, turbulent flow, laminar flow, etc.) for a given cartridge. In some embodiments, the electrode sleeve 132 can be shorter or longer (as shown in FIGS. 12A-12B below), providing for increased contact area (direct conduction) and gas exposure surface (lengthened flow holes and surface area through sleeve) for improved thermal conductivity. In some embodiments, a material can be provided between the electrode sleeve 132 and the nozzle body 116 (e.g., plastic or anodized aluminum) to insulate the components from one another.

Figure 3B:
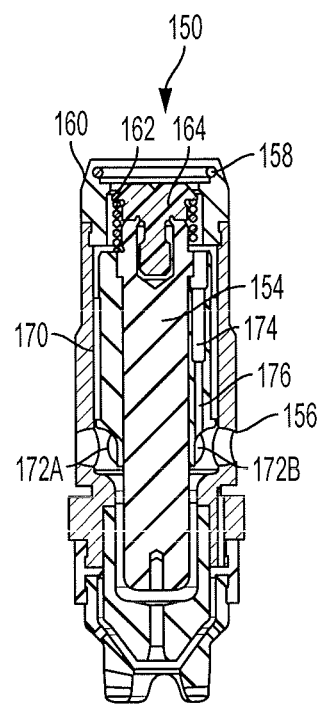
FIG. 3B is a cross-sectional illustration of a cartridge type consumable assembly including a spring electrode disposed within a nozzle body and a sealing device disposed within a lock ring, according to an illustrative embodiment of the invention.

FIG. 3B is a cross-sectional illustration of a cartridge type consumable assembly 150 including a spring electrode 154 disposed within a nozzle body 156 and a sealing device 158 (e.g., an o-ring) disposed within a lock ring 160, according to an illustrative embodiment of the invention. The sealing device 158 can be configured to connect to a plasma arc torch. The spring electrode 154 can include a resilient member 162 (e.g., a spring) and a thumbtack or contact element 164 that extends within the electrode 154 and is connected to the resilient member 162 disposed between the contact element 164 and the electrode 154. In some embodiments, the electrode sleeve 170 can have shaped (e.g., scooped) front ends 172A, 172B to direct gas flow within the consumable assembly 150. As above, the flow holes 174, 176 through the electrode sleeve 170 can have more than one diameter. The spring electrode 154 can function in a manner consistent with known spring electrodes.

Figure 4A:
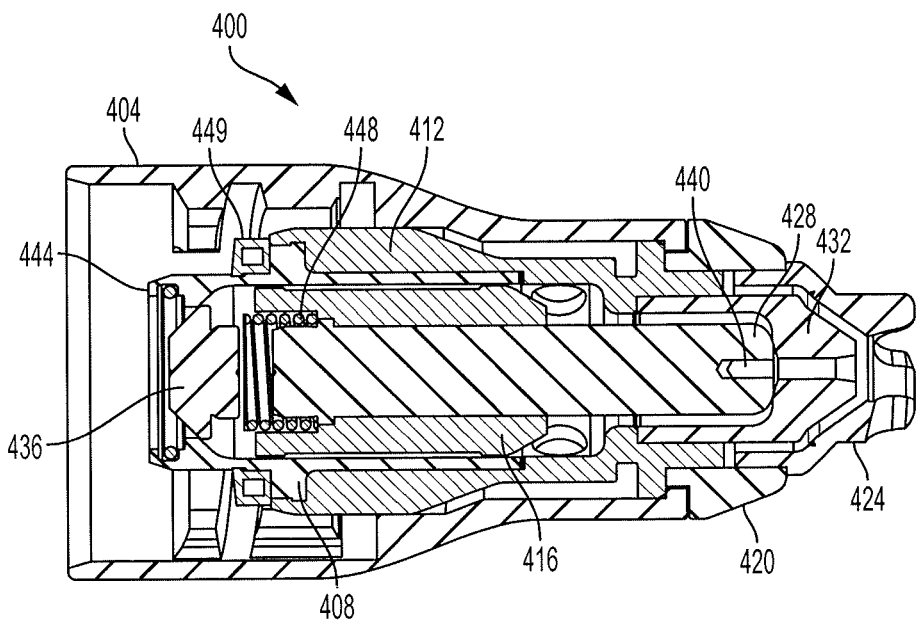
FIG. 4A is a cross-sectional view of a cartridge for a plasma arc cutting system having a spring, a molded retaining cap press fit to the nozzle base, and a quick turn thread feature, according to an illustrative embodiment of the invention.

FIG. 4A is a cross-sectional view of a cartridge 400 for a plasma arc cutting system, according to an illustrative embodiment of the invention. The cartridge 400 can include substantially similar components to those discussed above. Notably, in this embodiment, the cartridge 400 can have a total of twelve parts: two molded plastic (e.g., PEEK) parts (e.g., a retaining cap 404 and a nozzle base liner 408 (or "locking ring," or "isolation ring," e.g. as shown and described below in FIG. 9A); two machined aluminum parts (e.g., a nozzle base 412 and an electrode sleeve 416); one anodized aluminum part (e.g., a shield isolater or insulator 420, press fit to the aluminum nozzle base 412 and a shield 424); three copper parts (e.g., the shield 424, an electrode 428, and a nozzle 432); one plated brass part (e.g., an electrode contact button 436); one halfnium insert 440 in a bore of the electrode 428; one o-ring 444; and one spring 448. In some embodiments, the cartridge 400 includes an information storage device 449 (e.g., a RFID tag) for communicating information with a reader of the plasma arc torch (e.g., the reader 454 shown below in FIG. 4B). The RFID technology can function as described, for example, in U.S. Ser. No. 14/079,163, filed Nov. 13, 2013 and entitled "Automated Cartridge Detection for a Plasma Arc Cutting System," the contents of which are incorporated herein by reference in their entirety.

Figure 4B:
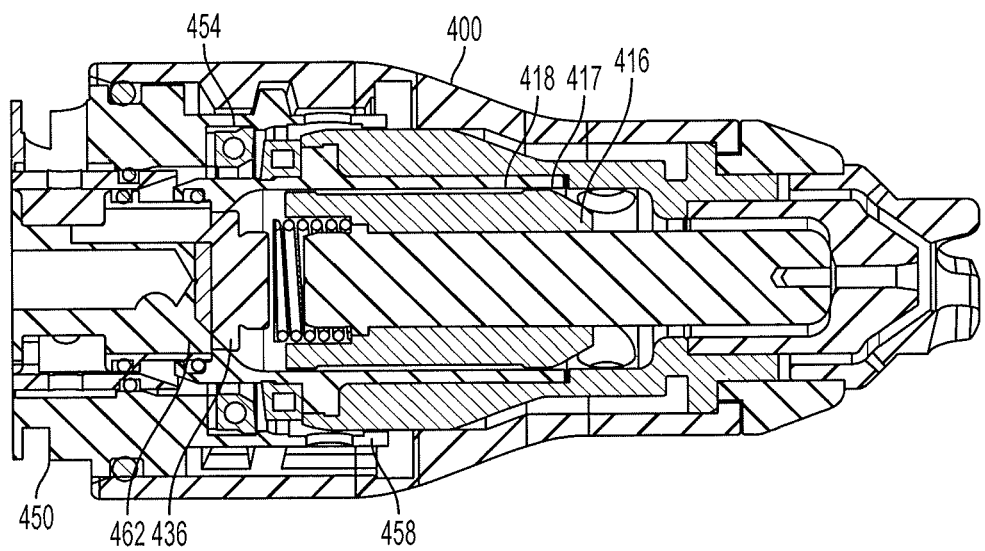
FIG. 4B is a cross-sectional view of the cartridge of 4A installed in a torch head, according to an illustrative embodiment of the invention.

FIG. 4B is a cross-sectional view of the cartridge 400 installed in a torch head 450, according to an illustrative embodiment of the invention. The torch head 450 can include an electrical contact 458, for example a Louvertac (shown and described in more detail in FIGS. 7A and 7B below). In this view, an outer diameter 418 of the electrode sleeve 416 is visible, which allows gas to flow through a gap 417. In some embodiments, the gap 417 is about 0.003 inches. When installed in the torch, the electrode contact button 458 makes contact with torch contact 462 and permits a current to flow to the cartridge 400 for ignition.

Figure 4C:
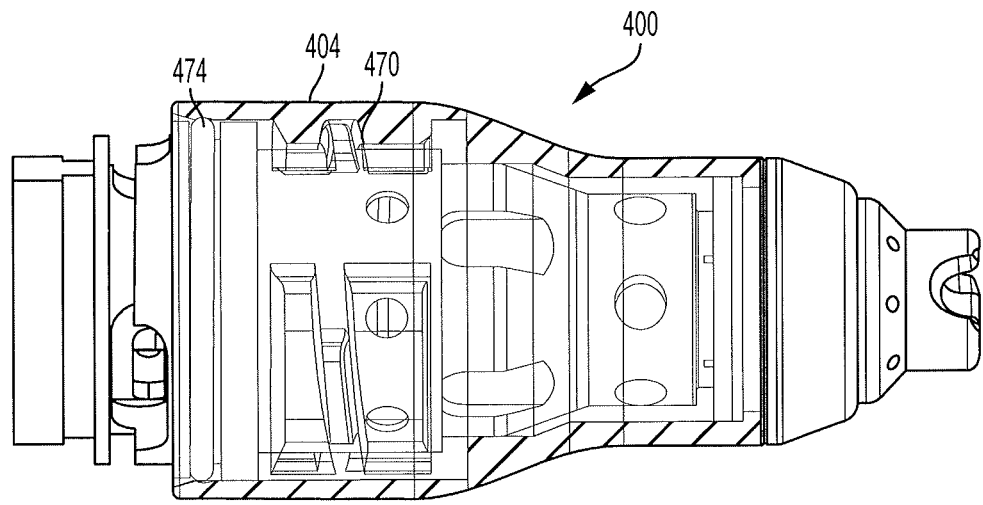
FIG. 4C is an exterior view of the cartridge installed in a torch head shown in FIG. 4B, the cartridge exterior rendered partially transparent to show a quick-turn thread feature, according to an illustrative embodiment of the invention.

FIG. 4C is an exterior view of the cartridge 400 installed in the torch head 450 shown in FIG. 4B, the cartridge exterior rendered partially transparent to show a quick-turn thread feature 470 formed on torch head 450 and an inner surface of retaining cap 404, according to an illustrative embodiment of the invention. The quick-turn thread feature 470 can be molded or shaped to mate with the retaining cap 404. The quick-turn feature can include a non-standard stub acme thread. When installing the cartridge 400 in the torch head 450, an operator can simply push the cartridge 400 until it encounters o-ring 474. Then, the operator can turn the cartridge 400 (e.g., one-third of one rotation) to lock the cartridge 400 into place. The quick-turn configuration carries the advantage of having no extra or moving parts, and can be simple to use and inexpensive to manufacture.

Figure 5:
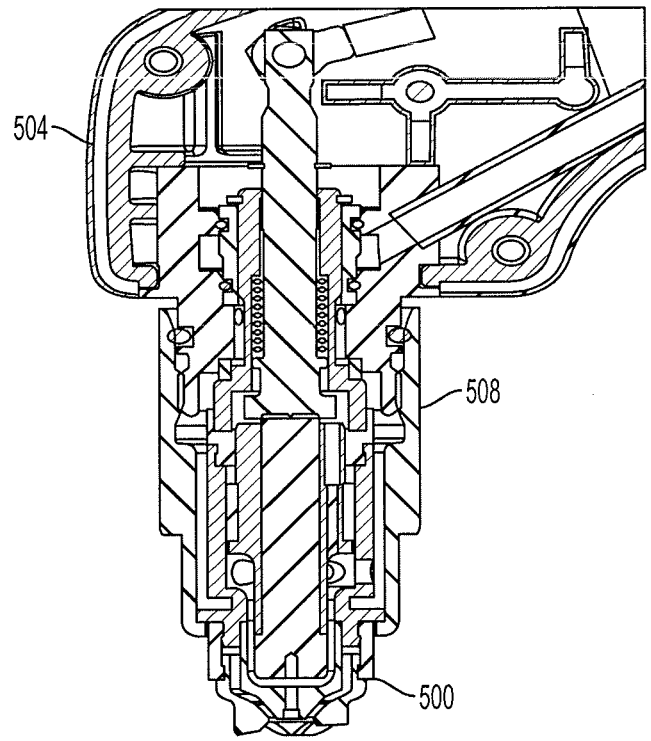
FIG. 5 is a cross-sectional view of a cartridge installed in a torch head, according to an illustrative embodiment of the invention.

FIG. 5 is a cross-sectional view of a cartridge 500 installed in a torch head 504, according to an illustrative embodiment of the invention (e.g., as in FIGS. 2A-3B, which show a torch connected via a separable retaining cap). In this configuration, the retaining cap 508 for connecting cartridges can be significantly simplified as compared to previous designs. For example, there is no need to use Vespel (as has been used in the past), which significantly reduces material costs. The retaining cap 508 can be made of aluminum (or, for a higher cost, brass or copper) with a simple plastic and/or composite shell covering. In some embodiments, a sleeve can be added to help retain the cartridge 500. In some embodiments, the retaining cap 508 can be part of the torch, e.g. not considered to be a consumable part. In some embodiments, the shapes and sizes of the pieces of the FIG. 5 assembly can be modified, provided that the required electrical isolations and/or required gas flows and current paths are maintained. In some embodiments, both plastics based and anodized based insulators may be used in this embodiment.

The cartridge designs shown and described above in FIGS. 1-5 can enable a fast cartridge change time (e.g., less than seven seconds). For example, an exemplary installation process can proceed in as little as two steps: (1) a cartridge can be dropped in the retaining cap; (2) the retaining cap can then be attached to the torch. Alternatively, if a cartridge has an integrated retaining cap, the cartridge can simply be twisted onto the torch. The system can then be ready for operation. In contrast, prior art systems have required that a consumable stack-up be assembled piece by piece by an operator. For example, the prior art assembly can include steps of: dropping a nozzle in a retaining cap; placing an electrode in a swirl ring; sliding the swirl ring and electrode into the retaining cap and nozzle; screwing a shield onto the retaining cap; and attaching the retaining cap to the torch to perform the cut, all while making sure that all components match for the desired process. Thus, the current invention significantly increases ease and economy of installing consumable components.

In some embodiments, cartridges are replaced as units, with no need to further assemble appropriate consumable stackups or select appropriate consumable combinations. In some embodiments, the length of the emitting element can be adjusted to match the life of the nozzle such that the cartridge parts reach the end of their useful lives at approximately the same time. In some embodiments, cut quality can be similar to that achieved using current consumables. In some embodiments, a spring need not be used with the electrode. Elimination of the spring may reduce manufacturing costs by eliminating the spring and thumbtack components on the top of the spring electrode. In some embodiments, machining steps can be minimized, with no machining necessary after assembly (as compared to some torch assemblies that require a final machining step to achieve functional axiality of the cartridge). In some embodiments, the reduction in swirl holes can minimize drilling operations compared to prior art swirl rings (the cross sectional area of these larger holes is roughly equivalent to the cross sectional area of all previous smaller holes). In some embodiments, particular components are or may optionally be molded or moldable, e.g., do not require machining. Thus, threading on the retaining cap and/or other components is not necessary to attach the components (e.g., cartridge consumable assembly), as the components can be already press fit together.

FIGS. 6-12 below show more detailed views of certain individual cartridge parts shown and described above separately from surrounding parts. These parts can be used with the embodiments described above, for example as shown and described in FIGS. 3A-3B, 4A-4C and/or 5.

Figures 6A, 6B:
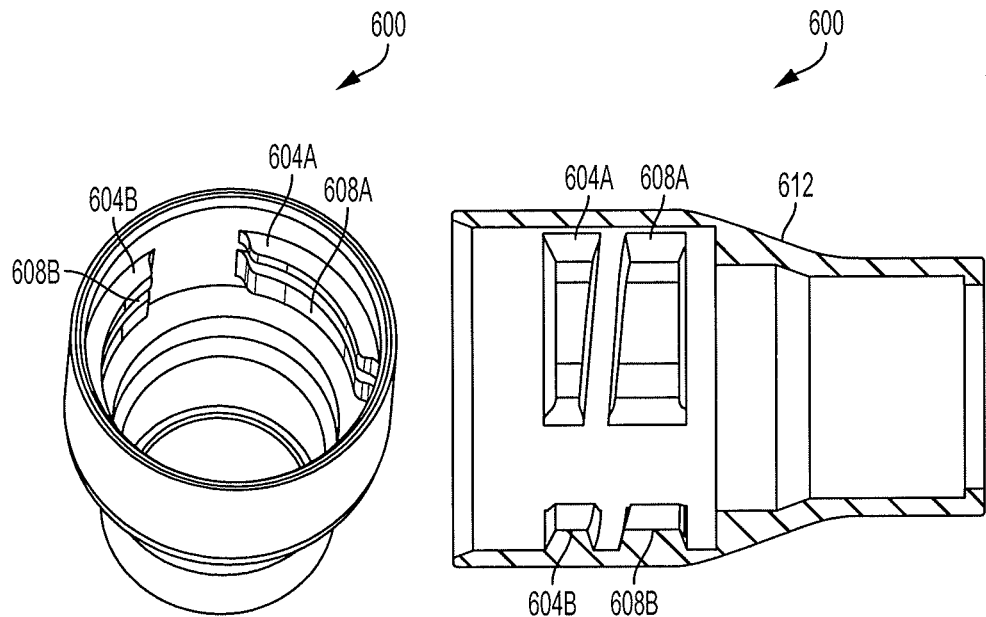
FIGS. 6A and 6B are top-perspective and cross-sectional views, respectively, of a retaining cap for a plasma arc torch, according to an illustrative embodiment of the invention.

FIG. 6A is a top-perspective view of a retaining cap 600 for a plasma arc torch, according to an illustrative embodiment of the invention, and FIG. 6B is a cross section view of the retaining cap 600. The retaining cap 600 includes threads 604 (e.g., 604A and 604B) and 608 (e.g., 608A, 608B). In some embodiments, the threads 604, 608 enable the retaining cap 600 to perform the quick-lock function when installed in the torch. In some embodiments, the retaining cap 600 is formed of molded PEEK. In some embodiments, the retaining cap includes a "non-standard 4 pitch stub acme." Further details of suitable threaded connector systems can be found in application Ser. No. 14/031,420, filed Sep. 19, 2013, entitled "Thread Connection for a Torch System," the contents of which are incorporated herein in their entirety. In FIG. 6B, the cartridge exterior 612 is depicted transparently so that the structure of the internal contours 604A-B, 608A-B is visible as viewed from the side.

Figures 7A, 7B:
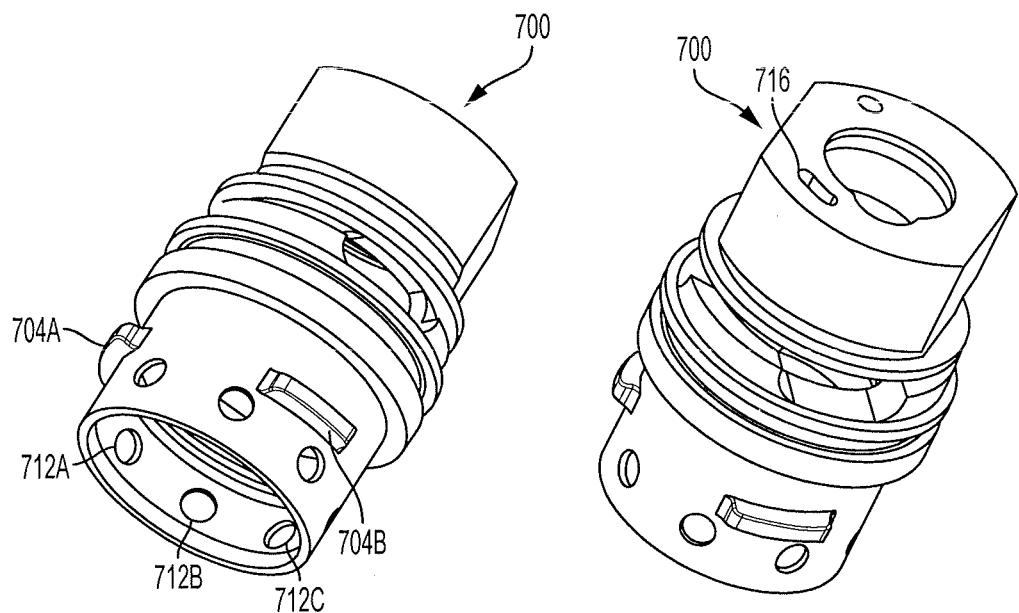
FIGS. 7A and 7B are top-perspective and bottom-perspective views, respectively, of a torch body, according to an illustrative embodiment of the invention.

FIGS. 7A and 7B are top-perspective and bottom-perspective views, respectively of a torch body 700, according to an illustrative embodiment of the invention (e.g., as shown in one or more embodiments described above). The torch body 700 includes quick-turn threads 704 (e.g., 704A, 704B) for mating to corresponding threads in the retaining cap 600 shown above. The torch body 700 also includes a groove 708 for a Louvertac and holes 712 (e.g., 712A, 712B, 712C) for incoming gas flow. The torch body 700 also includes a slot 716 for a RFID reader connector.

Figure 8A:
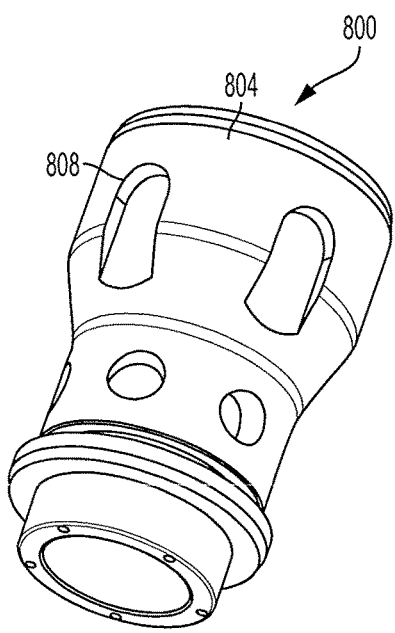
FIGS. 8A and 8B are perspective and cross-sectional views, respectively, of a nozzle base, according to an illustrative embodiment of the invention.
Figure 8B:
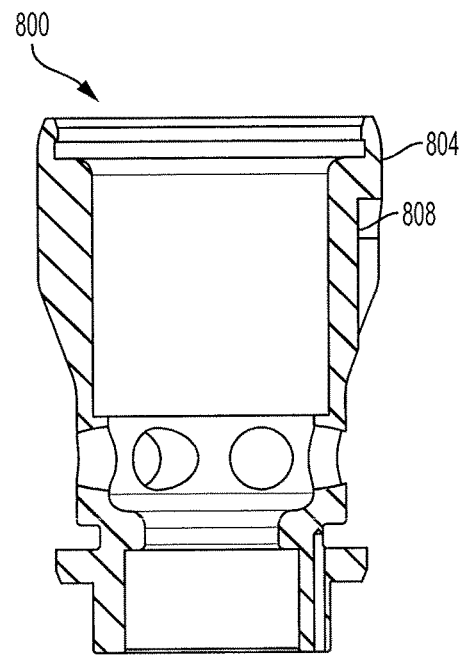

FIGS. 8A and 8B are perspective and cross-sectional views of a nozzle base 800, respectively, according to an illustrative embodiment of the invention. The nozzle base 800 includes an electrical contact surface 804 for mating with the torch body Louvertac. The nozzle base 800 also includes a gas flow slot 808 having an anti-rotation sharp edge lock 808. In some embodiments, the nozzle base 800 also includes an alignment feature for ensuring proper alignment within the torch head.

Figure 9A:
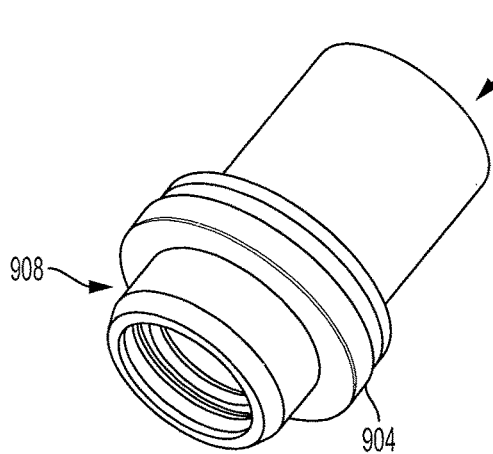
FIGS. 9A and 9B are perspective and cross-sectional views, respectively, of a locking ring, according to an illustrative embodiment of the invention.
Figure 9B:
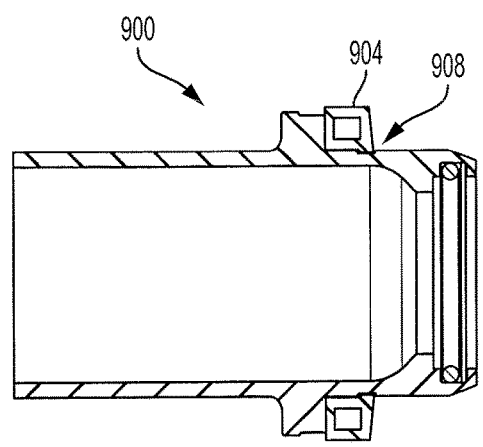

FIGS. 9A and 9B are perspective and side-exterior views, respectively, of a locking ring (or "locking ring," "isolation ring" or "nozzle base liner") 900 (e.g., nozzle base liner 408 as shown above in FIG. 4A), according to an illustrative embodiment of the invention. The locking ring 900 can be formed of molded PEEK and can include a RFID tag 904 snapped onto the locking ring 900. The locking ring 900 can be the interface between the torch and the cartridge. The locking ring 900 can be pressed into the nozzle body to trap the moveable electrode. The locking ring 900 can contain the cartridge components within the cartridge and electrically isolate the torch from the cartridge. In some embodiments, the locking ring 900 can be replaced by heat shrinking or gluing. In some embodiments, the locking ring 900 is shaped to orient the cartridge (e.g. axially), to optimize gas flow, to enable electrical connection to the cathode and/or to provide electrical isolation. In some embodiments, the locking ring 900 includes a circumferential flange or step feature 908 shaped to connect to a complementary flange on the nozzle body by forming a snap fit arrangement to prevent disassembly or separation of the two components following installation.

Figures 10A, 10B:
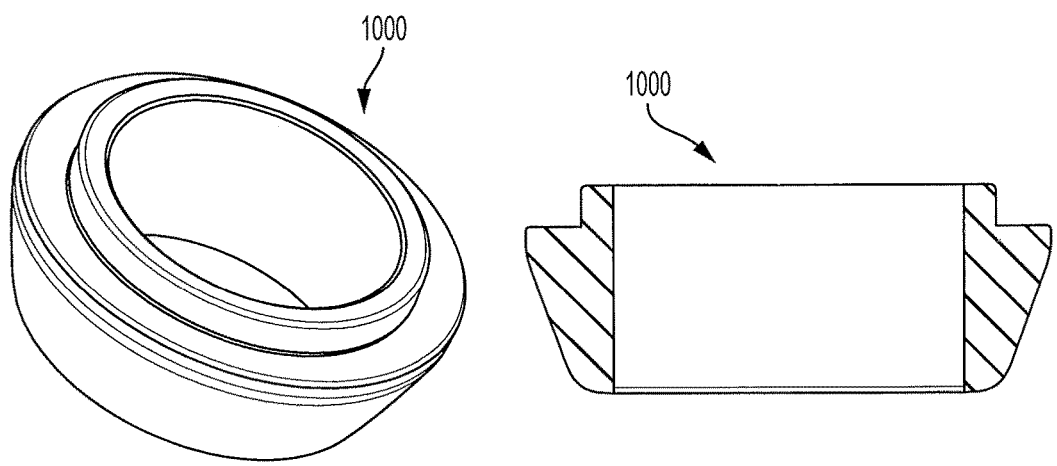
FIGS. 10A and 10B are perspective and cross-sectional views, respectively, of a shield isolator (or shield insulator), according to an illustrative embodiment of the invention.
Figures 11A, 11B:
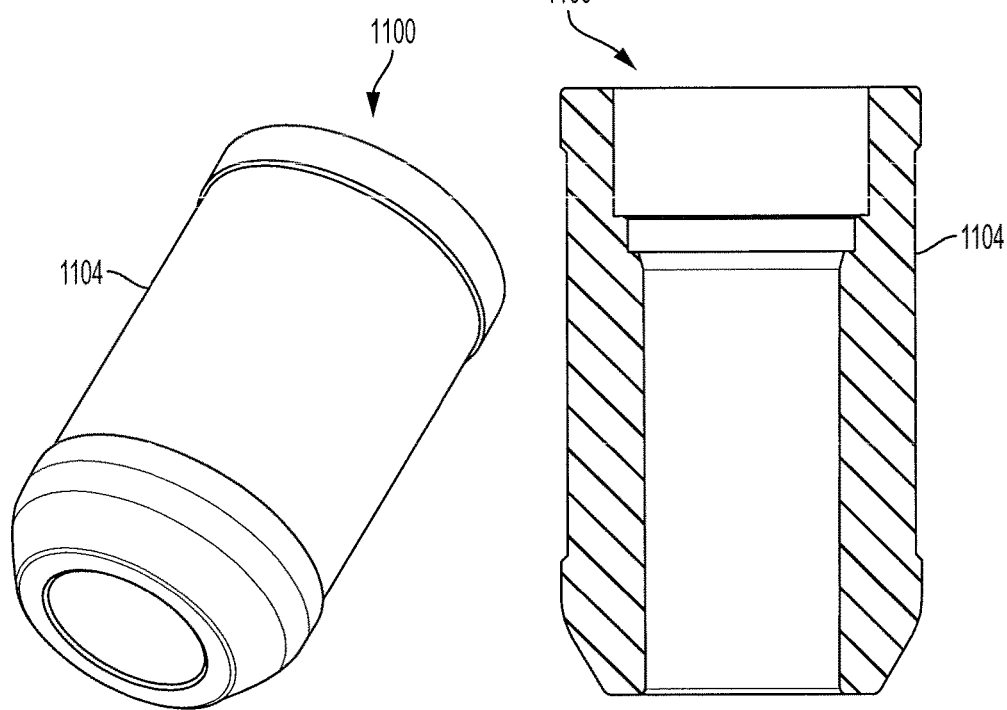
FIGS. 11A and 11B are perspective and side-exterior views, respectively, of an electrode sleeve, according to an illustrative embodiment of the invention.

FIGS. 10A and 10B are perspective and cross-sectional views, respectively, of a shield isolator 1000, according to an illustrative embodiment of the invention. The shield isolator 1000 can be made of anodized aluminum or other suitable dielectric material. FIGS. 11A and 11B are perspective and cross-sectional views, respectively, of an electrode sleeve 1100, according to an illustrative embodiment of the invention. An outer surface 1104 of the electrode sleeve 1100 can facilitate gas flow and heat transfer within and throughout the torch. In some embodiments, the electrode sleeve comprises aluminum, anodized aluminum, and/or thermoplastics.

FIGS. 12A and 12B are cross-sectional views of shortened and elongated electrode sleeve assemblies, 1200 and 1250 respectively, according to an illustrative embodiment of the invention. The elongated electrode sleeve assembly 1200 includes an elongated portion 1204, while the shortened assembly 1250 includes a shortened portion 1208.

While the invention has been particularly shown and described with reference to specific preferred embodiments, it should be understood by those skilled in the art that various changes in form and detail may be made therein without departing from the spirit and scope of the invention as defined by the following claims. In particular, the dimensions shown and discussed herein are offered by way of example only and are not intended to be construed as limiting. In addition, the materials described are exemplary, and other materials can be used while remaining within the spirit and scope of the technology.

The invention claimed is:

1. A metallic frame for a replaceable, unitary cartridge configured for installation into a plasma arc cutting torch, the metallic frame comprising:
    a first end connected to a nozzle, and a second end configured to mate with an electrode, the metallic frame surrounding and inseparably securing the electrode in electrical isolation from the metallic frame and the nozzle;
    a set of flow passages built into the metallic frame, the set of flow passages fluidly connecting an internal surface of the metallic frame and an external surface of the metallic frame, the set of flow passages radially offset to impart a swirling fluid flow pattern to gases flowing therethrough; and
    a plasma gas exit orifice for constricting exiting plasma gas, the plasma gas exit orifice included within, or in direct physical communication with, the nozzle, wherein the set of flow passages is oriented toward the plasma gas exit orifice.

2. The frame of claim 1 wherein at least one of the first or the second end includes a threaded region shaped to engage a complementary component.

3. The frame of claim 1 wherein the set of flow passages includes a plurality of holes that are radially offset from one another.

4. The frame of claim 3 wherein the radial offset is 0.05 inches to 0.5 inches.

5. The frame of claim 1 wherein the first end is configured to connect to a shield via a shield insulator.

6. The frame of claim 5 wherein the frame facilitates thermal communication between the shield and the nozzle.

7. The frame of claim 1 wherein the external surface of the metallic frame is configured to connect to a retaining cap.

8. The frame of claim 1 wherein the flow passages each have a diameter of about 0.14 inches.

9. The frame of claim 1 further comprising a shield insulator connected to the metallic frame.

10. The frame of claim 2 further including a locking ring connected to the second end of the cartridge frame, the cap insert orienting the electrode and retaining it within the cartridge frame.

11. The frame of claim 10 further comprising a seal disposed within the locking ring.

* * * * *